United States Patent [19]
Staron et al.

[11] Patent Number: 5,483,654
[45] Date of Patent: Jan. 9, 1996

[54] APPARATUS TO SELECT COMPUTER PROGRAM FOR EXECUTION

[75] Inventors: Raymond J. Staron, Richmond Heights; Thomas J. Burke; Colleen A. Rinehart, both of Chagrin Falls; Taryl J. Jasper, South Euclid, all of Ohio

[73] Assignee: Allen-Bradley Company, Inc., Milwaukee, Wis.

[21] Appl. No.: 122,861

[22] Filed: Sep. 15, 1993

[51] Int. Cl.$^6$ ........................................... G06F 9/44
[52] U.S. Cl. .................... 395/650; 364/DIG. 1; 364/286.2; 395/156
[58] Field of Search .................... 395/156, 157, 395/159, 650

[56] References Cited

U.S. PATENT DOCUMENTS

| | | | |
|---|---|---|---|
| 5,119,475 | 6/1992 | Smith et al. | 395/156 |
| 5,204,947 | 4/1993 | Bernstein et al. | 395/157 |
| 5,241,655 | 8/1993 | Mineki et al. | 395/156 |
| 5,291,593 | 3/1994 | Abraham et al. | 395/157 X |
| 5,297,249 | 3/1994 | Bernstein et al. | 395/156 |

*Primary Examiner*—Thomas M. Heckler
*Attorney, Agent, or Firm*—John J. Horn; George A. Montanye

[57] ABSTRACT

A "navigation protocol" is implemented via a computer program to provide communication and invocation capability among object-oriented application programs and pre-compiled library routines, collectively referred to as 'programs'. Each application program is "registered" with the operating environment during its installation; registration entails updating a registration-table data structure with information about 1) a program identifier; 2) an object-type identifier identifying a class of objects; and 3) an action identifier, e.g., a menu entry, identifying an action which the program can perform on objects of the class specified by the object-type identifier. A user can manipulate an object by selecting the object and requesting that a list of all actions performable on the object be displayed, then selecting one of the displayed possible actions. The displayed actions are actually performed by programs as specified in the registration table; the user need not be concerned with knowing which program to invoke. Programs from a variety of different vendors can interact without any one program needing to know about any other program. This modularity uncouples the development process of the user's system from that of the organizations providing the individual development tools and allows the user to upgrade individual programs as desired.

8 Claims, 6 Drawing Sheets

Microfiche Appendix Included
(330 Microfiche, 4 Pages)

APPLICATION WINDOWS

| APPLICATION IDENTIFIER | OBJECT OF ACTION | ACTION IDENTIFIER |
|---|---|---|
| EDITOR | PROGRAM | "EDIT" |
| PROJECT ORGANIZER | PROJECT | "VIEW" |
| I/O DESCRIPTION | I/O POINT | "CONFIGURE" |
| I/O TREND | I/O POINT | "MONITOR" |
| I/O SIMULATOR | I/O POINT | "SIMULATE" |
| ⋮ | | |

403 — I/O DESCRIPTION row
405 — I/O TREND row
407 — I/O SIMULATOR row

REGISTRATION TABLE 401

APPARATUS TO SELECT COMPUTER PROGRAM FOR EXECUTION

TABLE OF CONTENTS

1. BACKGROUND OF THE INVENTION
2. SUMMARY OF THE INVENTION
3. BRIEF DESCRIPTION OF THE DRAWINGS
4. DETAILED DESCRIPTION OF SPECIFIC EMBODIMENTS
   4.1 Introduction
   4.2 Overview of Environment
   4.3 Hypothetical Example of Operation
   4.4 Registration-Table Data Structure
   4.5 Establishing the Environment
5. CLAIMS
ABSTRACT

1. BACKGROUND OF THE INVENTION

The invention relates to a process executed by a computer system to increase the ease and efficiency of developing large, complex, software projects by providing a common interapplication communications protocol.

Microfiche appendixes A and B (4 Fiche, 330 pages) set out copyrighted manuals containing general use information concerning a commercial software package, created by the assignee of the application, which incorporates aspects of the invention. Permission is granted to make copies of the appendixes solely in connection with the making of facsimile copies of this application or any patent issuing therefrom in accordance with applicable law; all other rights are reserved, and all other reproduction, distribution, creation of derivative works based on the contents, public display, and public performance of the microfiche appendices or any part thereof are prohibited by the copyright laws.

In the discussion below, the male gender is used for convenience and should be interpreted as encompassing the female gender as appropriate.

In object-oriented (OO) software analysis and design, a major concern is that of modeling the domain of interest. Modeling is a process by which recognized important characteristics of the domain are identified and described. A major goal of OO software design is to make the correspondence between software objects and "real" objects (e.g., those entities being modeled) as accurate and as transparent as possible to maintain the consistency between the real world system being modeled and its software image or model.

One problem that exists in modeling control systems, e.g., in the area of computer-assisted manufacturing and related robotics fields, as well as in other domains, is that of communication between what may be a large number of different stand-alone application programs or executable library routines that may be needed during the development of complex control system software. (In the interest of simplicity, all future references herein to "application programs" or "programs" should be read as including other executable routines such as those embedded in precompiled libraries.)

Figure 1:
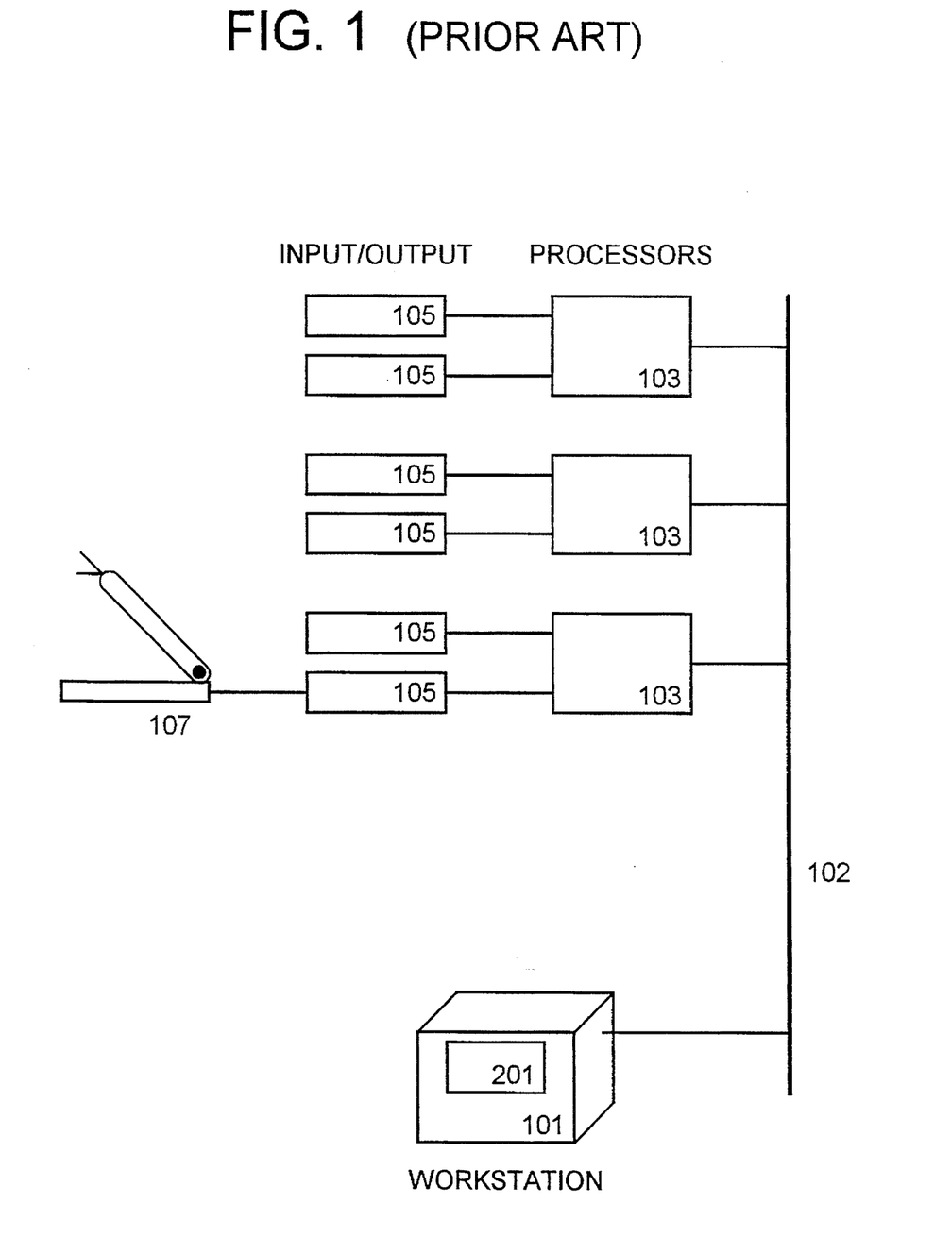
FIG. 1 is a block-diagram representation of a prototypical control system.

Referring to FIG. 1, in the prior art, block 101 represents a workstation terminal which may house numerous software application programs which a user uses to control, monitor and configure the control system. Workstation 101 is connected to various processors 103 used in the control system by a communications network 102. The processors all have input-output (I/O) connections 105 which are connected to elements of a machine or process with which the user is concerned. As an example, one I/O connector is shown as connected to a robot arm 107.

The complexity of the system may require that the user of the workstation 101 operate many different application programs to accomplish his task. It is desirable that all the application programs be able to share information regarding the machine or process about which the user is concerned. It is likewise desirable for the user to have a convenient way to move from application program to application program. During the development of large and complex software projects such as a control system however, it may often be necessary to use a number of different and autonomous development application programs or precompiled library routines (e.g., program editors, process monitors, and project overview application programs). These different programs may well be products of a wide variety of organizations and might not be designed for effective interapplication communication.

2. SUMMARY OF THE INVENTION

A method in accordance with the invention is referred to herein as conforming to an object-oriented "navigation protocol," implemented via a computer program to provide interapplication communication and invocation capability. The navigation protocol describes a process and defines a set of software rules, or guidelines, that assure the user/developer operates within a consistent and easy-to-use system that is flexible enough to allow him to perform whatever task he wishes (via a selected program) in whatever order he chooses.

Application programs are "registered" with the operating environment during their installation. Registration entails updating a registration-table data structure with information about 1) an application program identifier; 2) an object-type identifier identifying a class of objects; and 3) an action identifier, e.g., a menu entry, identifying an action which the application program identifier can perform on objects of the class specified by the object-type identifier.

A user can manipulate an "object" by selecting the object and requesting that a list of all actions performable on the object be displayed, then selecting one of the displayed possible actions. The displayed actions are actually performed by application programs as specified in the registration table; the user need not be concerned with knowing which program to invoke.

The navigation protocol provides a means of effecting communication and invocation between autonomously running programs. Though the user may perceive that one program is invoking another, the transition from one program to another is achieved through the navigation protocol.

Application programs from a variety of different vendors thus can interact without any one program needing to know about any other program. This modularity helps uncouple the development process of the user's system from that of the organizations providing the individual development tools and allows the user to upgrade individual application programs as desired.

4. DETAILED DESCRIPTION OF SPECIFIC EMBODIMENTS

4.1 Introduction

One illustrative embodiment of a method in accordance with the invention is described below as it might be implemented in a computer system with a window-style user interface. An actual implementation of such a program might be executable on an 80486 based computer executing Microsoft Windows®, or one or more other suitable computer systems. For illustrative purposes, a development environment such as that provided by Microsoft Windows* is assumed; similar environments such as OS/2, NeXTSTEP, and the like may be used with necessary changes being made.

For purposes of further illustration, microfiche appendixes A and B are copyrighted manuals containing general use information concerning a commercial software package distributed by the assignee of the application program which incorporates the invention.

In the interest of clarity, not all features of an actual implementation are described in this specification. It will of course be appreciated that in the development of any such actual implementation (as in any software development project), numerous programming decisions must be made to achieve the developers' specific goals and subgoals, such as compliance with system- and business-related constraints, which will vary from one implementation to another. Moreover, it will be appreciated that such a development effort might be complex and time-consuming, but would nevertheless be a routine undertaking of program development for those of ordinary skill having the benefit of this disclosure.

4.2 Overview of Environment

Figure 2:
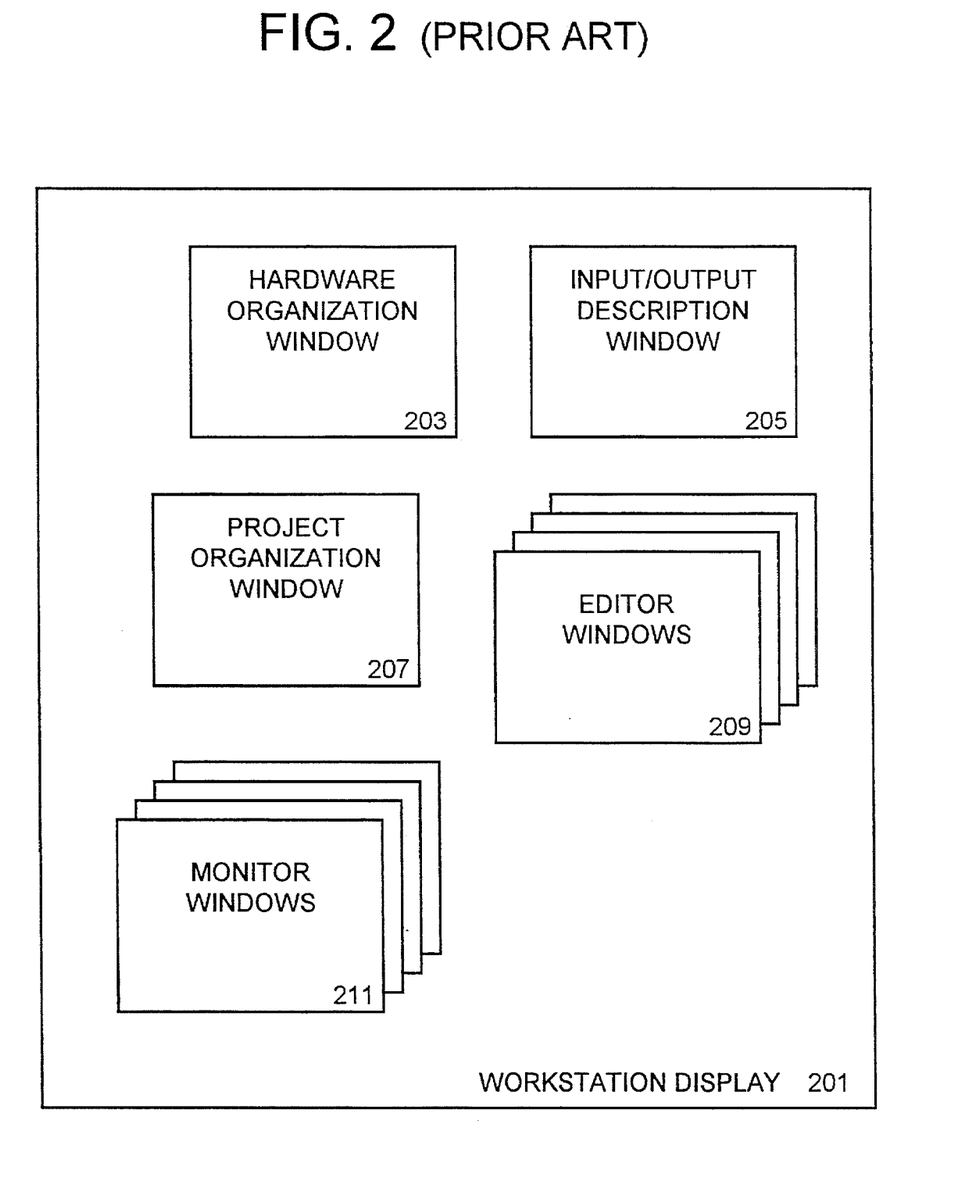
FIG. 2 is a block-diagram representation of a computer workstation screen with a number of different active "windowed" application programs such as might exist on a computer system running Microsoft Windows*.

An overview of the environment in which the invention is used is shown in FIG. 2. Block 201 represents one possible display configuration of a hypothetical workstation 101. Blocks 203,205,207,209, and 211 represent application programs which generate window-like displays on the workstation display. Block 203 represents an application program that manages the control system's hardware organization. Block 205 represents an application program that is used to describe the I/O that is representative of the machine or process under control. Block 207 represents a project organization application program which, for example, may allow the user to employ the concepts of functional decomposition to organize his own work. Block 209 represents control language specific editors which allow the user to program the various processors, shown as block 103 in FIG. 1, in whatever control language is deemed appropriate for the task at hand. Blocks 211 represent monitors which allow the user to observe and manipulate the control system and the machine or process under control while it is actually operating.

All of these blocks represent tasks that the user may need to perform in the design phase, maintenance phase, and day-to-day running of the control system. Further, all of these blocks represent software application programs that may need to be developed. For efficient and timely development of such complex control systems, it is desirable that these application programs be able to be developed in parallel; different parts of the organization or indeed, different organizations altogether, might each develop some subset of the application programs needed. From the point of view of schedules, configuration management, and version dependence these application programs are developed independently of one another. Finally, for the control system to perform its designed goal in optimum fashion, the application programs preferably should work together.

4.3 Hypothetical Example of Operation

Figure 3:
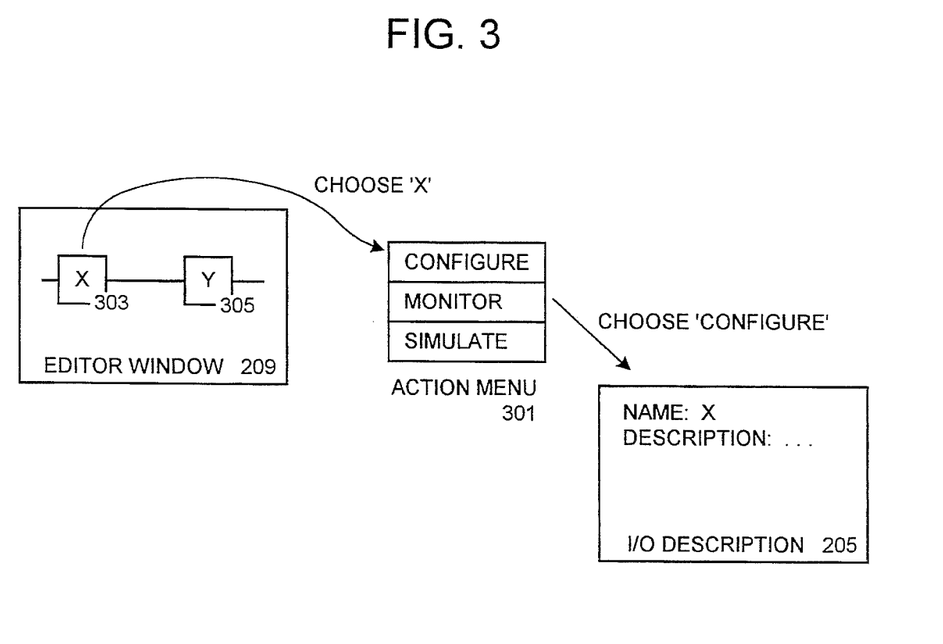
FIG. 3 is a data flow diagram showing the user's (operational) view of the navigation protocol.

A useful approach to understanding the invention is to consider a specific hypothetical example. FIG. 3 depicts a the sequence of events which could occur in the process of a user moving from one application program to another, in this case, moving from a language-specific editor shown at block 209 to an I/O description window labeled 205. The letter 'X' (labeled 303) in block 209 represents the name of an I/O point, e.g., a robot arm sensor, that is referenced in the program being displayed by the editor 209.

Through some user action (e.g., use of a mouse or other pointing device to select the label 'X' and then pressing, for example, the right mouse button), the system displays a list of available actions, shown in the drawing as Action Menu 301. Each of the action menu entries represents a task that the user can perform on a software model of the selected I/O point (and ultimately on the "real" I/O point). As in many menus, the user can select any one of the available options. In the example depicted the user chooses the word "configure" and, subsequently, an application program labeled "I/O description," block 205, is invoked and generates a display which appears on the workstation screen in its own window, performing its action on a software model of I/O point 'X' as selected in the original application program 209.

In addition, the user may select more than a single object. For instance, in FIG. 3 he may select the I/O point 'X' and the object 'Y' (labeled 305). In this case the resulting action menu would contain a list of all those functions that are applicable to both objects 'X' and 'Y': if the list of actions applicable to the I/O point 'X' consists of configure, monitor, and simulate, and the list of actions applicable to the object 'Y' consists of configure, monitor, and close, the resulting action menu would contain the actions configure and monitor. This is true even if the operation "configure" is implemented differently for object 'X' and object 'Y'. Thus, the invention makes explicit use of polymorphism—a well known attribute of the object-oriented programming paradigm.

The foregoing describes a general mechanism by which a user can navigate from one application program to another. There could also be shortcuts where another user action, for example, a double-click of the left mouse button, could choose some predetermined action and forego the actual display of the menu. In that case, some action specified at installation time would be the default action. For example, if in FIG. 3 the "monitor" action had been the specified default action and the user had clicked the left mouse button twice, the menu would never appear; instead only the subsequent application program would appear in the same way as if the menu had come up and the user had selected "monitor." The implementation of shortcuts in this manner is well known to software developers working in a graphical user interface environment; such shortcuts could also include, for example, use of specific control-key combinations to achieve similar results.

4.4 Registration-Table Data Structure

Figure 4:
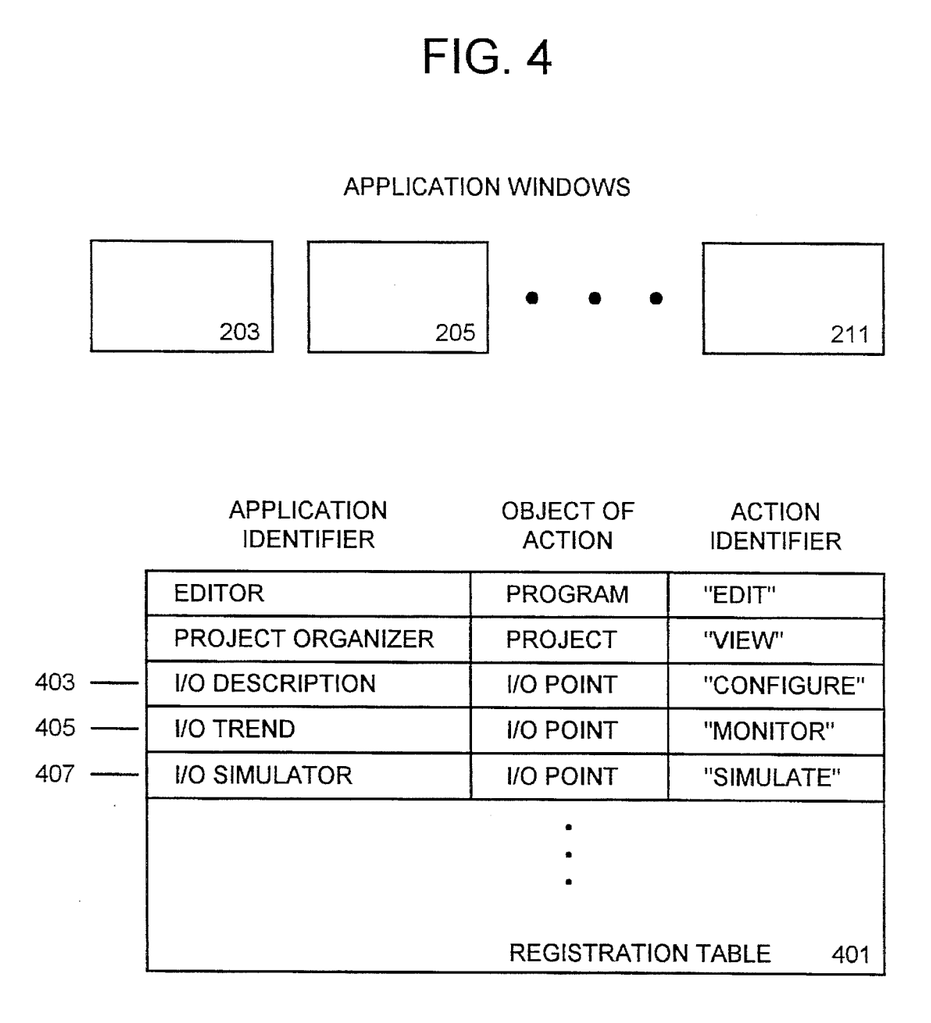
FIG. 4 depicts the navigation protocol's registration table.

A registration-table data structure which may be used in implementing the foregoing method is illustrated in FIG. 4. As noted above, blocks 203,205, and 211 represent example application programs. Block 401 in FIG. 4 represents a registration-table data structure which stores information about those application programs.

In the illustrative embodiment, the registration table 401 is installed into the workstation's memory, as described below in reference to FIGS. 6 and 7, before any application program is loaded and executed. As each application program is loaded into memory (hard disk or working ["RAM"] memory) at least one and possibly many entries for that application program are written to the registration table data structure in the form of a substructure such as a row in a table. (It will be apparent that other structures and substructures can similarly be used, e.g., in an object-oriented or hierarchical database paradigm.).

An entry in the registration table comprises, at a minimum, three attributes: 1) a name or identifier of the application program, 2) an identifier of the "object" on which the application program will operate, and 3) a user-visible identifier, ultimately displayable as a menu text item, specifying the action to be performed.

There could also be other fields in this table depending on the implementation. The other fields could specify, for example, actual invocation syntax for a particular application program. Such a feature makes it possible to invoke programs that were not originally designed to work within the navigation protocol of the invention. For instance, an additional field could contain a command-line structure that would invoke an application program through standard operating system calls.

The registration table data structure is used as a repository for the information that needs to be accessed during operation of the navigation protocol. It contains information necessary to satisfy commands such as (in natural-language form): "Identify all actions that can be performed on program-type objects" ; "Identify all actions that can be performed on project-type objects" ; and "Invoke the application program that performs the action "view" on a selected project-type object."

Block 403 (third entry, or row, in the registration table 401) shows a table entry that might accommodate the navigation example of FIG. 3. In detail, an application program called "I/O description" is shown in the table; the application program operates on objects of the type I/O point and is associated with a user-readable identifier in the form of the word "configure." The existence of this entry in the registration table enables the word "configure" to appear in the action menu 301 of FIG. 3. In short, the registration table 401 is the storage mechanism for information needed to implement the navigation protocol involved in bringing up the action menu 301 and any subsequent application program in the FIG. 3 example.

Figure 5:
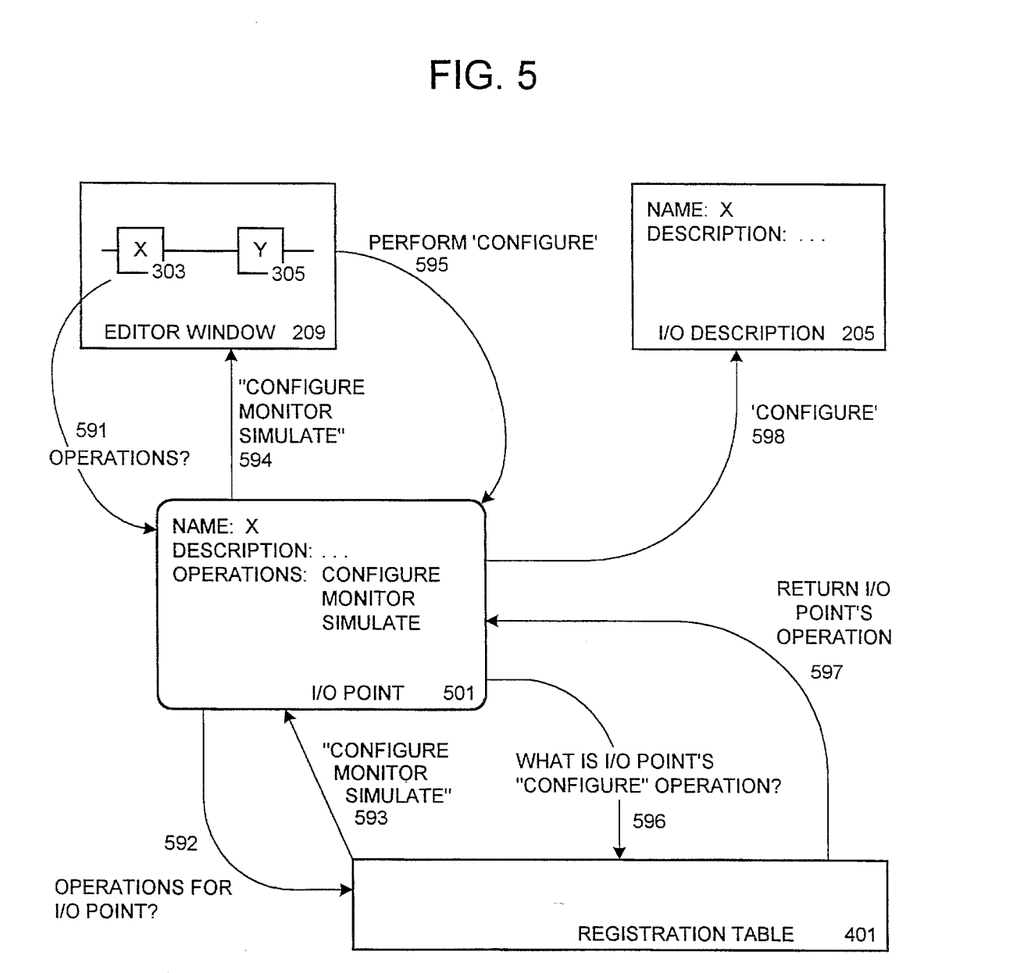
FIG. 5 is a data flow diagram of the navigation protocol's interapplication invocation process.

FIG. 5 is a modified data flow diagram showing the sequence of operations that result from the user action outlined in FIG. 3. Block 205 and 209 represent the application programs cited in the example of FIG. 3. Block 303 represents an I/O point. The operations are labeled 591 through 598 in that order. Block 501 is an object representation of I/O point 'X' 303.

The sequence of operations resulting from the user action is as follows. While using application program 209, the user selects I/O point 'X' 303, indicating that he would like to see a list of available operations. Selection can typically be done by a single click on the left mouse button, for example. After the request is made by the user, operation 591 is executed, namely a request to I/O object 501 for a list of operations.

In order to satisfy the user's request, the object 501 makes an equivalent request to the registration table 401, labeled 592. Because object 501 is an I/O point-type object, the request to the registration table is, in effect, "Give me the list of all operations that are pertinent to an I/O point." Referring back to FIG. 4, the registration table 401 shows three entries (403,405, and 407) for I/O points, one entry for each of the available actions shown in block 301. The three words "configure," "monitor,"and "simulate" are returned as part of operation 593 and are passed back through I/O point object 501 to the originally requesting application program 209. Application program 209 then displays the menu (see FIG. 3, block 301).

When the user chooses the action "configure," another request from application program 209 to the selected I/O point, denoted by operation 595, is generated. To satisfy this second request the I/O point object 501 makes another request of the navigation table 596: "What is the operation 'configure' for the class of object 'I/O point'". The answer is returned in 597. In this case the answer is "Bring up a version of the I/O description application program." That information is passed back to the I/O object 501 in operation 597 and eventually causes a new application program 205 to be invoked in operation 598. If the target application program is already active, the navigation protocol recognizes this and could either: 1) instantiate a new child window for the executing application in which to carry out the users command or 2) bring up (e.g., make active or modal) a previously instantiated application window.

A benefit of this approach is that the application program 209 had no explicit knowledge of the existence or details of application program 205. Application program 209 can work in the system both with and without application program 205, and application program 205 can work both with and without application program 209 without any change to their design or implementation. If application program 205 did not exist, there would be no entries for it in the registration table 401 and the entries would not have appeared in any menu that 209 would have been asked to display. That means that two independent development organizations can develop application programs 205 and 209. It also means that new versions of application programs 205 and 209 can be developed and shipped independently from each other with no dependencies on each other's schedules as long as the application programs adhere to this (navigation) protocol.

4.5 Establishing the Environment

Figure 6:
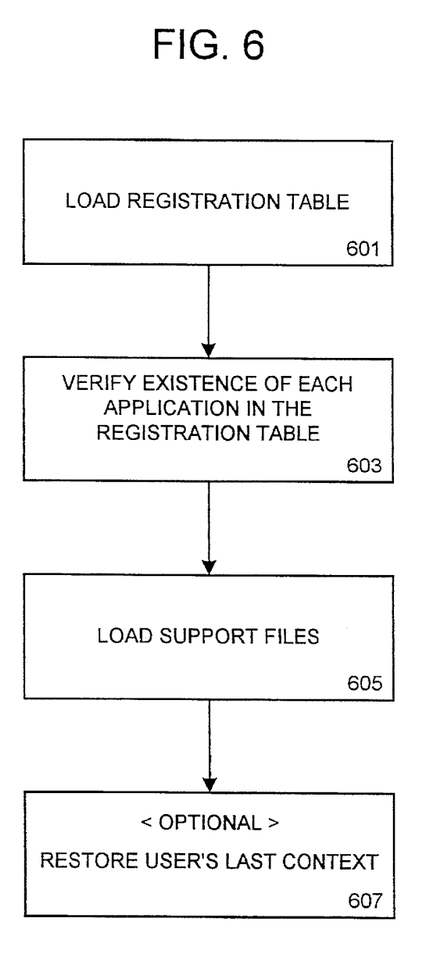
FIG. 6 is a flow chaff of the navigation protocol's "Initialization" sequence.

FIG. 6 is a flow chart depicting illustrative steps in establishing a user environment of the kind described above. The steps may be executed by a dedicated application program (e.g., executing in a Microsoft Windows®environment), the purpose of which is to establish a specific user context.

Block 601 indicates that the registration table 401 is loaded into memory. In block 603 each entry in the registration table is verified. In particular, it is preferable to verify that the specified application program exists in storage (e.g., hard disk) where the registration table indicates.

Next, support files are loaded as shown in block 605. Lastly, as a convenient feature to the user, the environment could decide to restore the user's last context, i.e., return the system to the state it was in when the environment was last shut down. This could include starting the application programs that were in use at the last shut down and instantiating all the objects on which the application programs were running.

Figure 7:
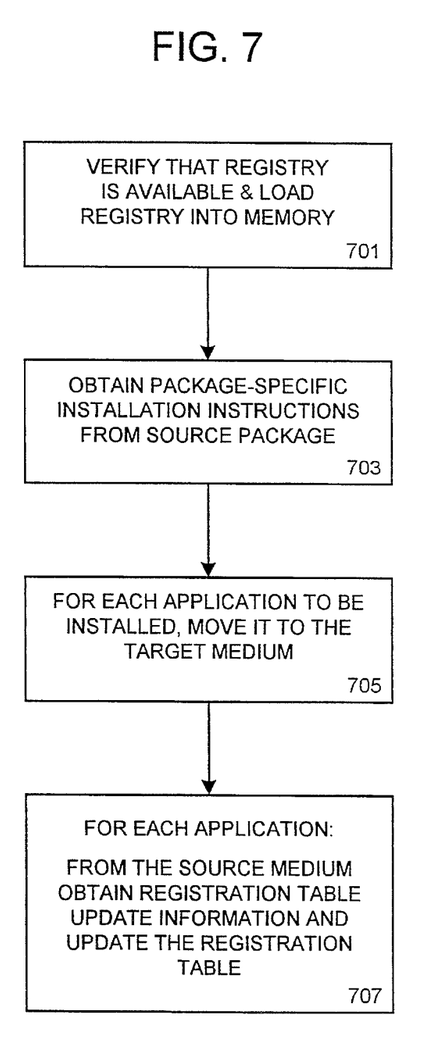
FIG. 7 is a flow chart of the navigation protocol's "Installation" sequence.

FIG. 7 is a simplified flow chart depicting steps that can be executed in registering (installing) new application programs into a system in accordance with the invention. Upon initiation, the installation procedure verifies that the registry is available, that it resides in system storage (e.g., hard disk) in its proper form and loads the registry and support code used in manipulating the registration table into memory as shown in block 701. In block 703, the installation procedure obtains the specific installation instructions from the source package (i.e., the application program being registered) which will typically include a list of application programs that need to be installed, a list of required support files and the like.

Blocks 705 and 707 are performed for each of the application programs in the aforementioned application programs list. Each application program and its support files are physically moved from the source medium (e.g., floppy disks) to the target medium (e.g., the workstation's hard disk) in block 705. In block 707, the source medium is searched for registration table update information which, in accordance with FIG. 4, includes the name of the application program, the name of the object that the application program operates on, the action word used to invoke the application program, and any possible supplemental information that is required by the registration table (contained in additional columns that could exist in the registration table 401). Programming details such as data integrity checking, data compression and decompression on the source medium, backup of the registration table file(s) prior to making alterations, and the like are well-known to those of ordinary skill and are not described further.

Additional information concerning a specific installation procedure is set forth in chapter 7 of Appendix A, entitled "Allen-Bradley ISP Tool Kit-Programming."

It will be apparent to those of ordinary skill having the benefit of this disclosure that the registration data structure and its respective substructures may be implemented in the well-known "object oriented" form in a variety of ways. Such implementations would typically involve the use of inheritance by a subclass of objects of application program identifiers and action identifiers from their respective superclasses unless overridden with more specific identifiers particular to the classes themselves.

It will be appreciated by those of ordinary skill having the benefit of this disclosure that numerous variations from the foregoing illustration will be possible without departing from the inventive concept described herein. Accordingly, it is the claims set forth below, and not merely the foregoing illustration, which are intended to define the exclusive rights claimed in this application program.

What is claimed is:

1. An apparatus for selecting application programs installed in a memory of an electronic computer to be executed by the electronic computer when invoked through an application identifier, the apparatus comprising:

(a) a table in the memory for storing application identifiers, object data, and actions, the table linking each application identifier with at least one type of object data and at least one action that may be performed by the identified application;

(b) a first selection means for selecting a type of object data to provide a selected type of object data;

(c) searching means communicating with the table to identify actions and applications linked by the table to the selected type of object data;

(d) a second selection means for selecting an action from among the identified actions to provide a selected action; and (e) execution means for invoking the application program linked to the selected action to operate on the selected type of object data;

(f) whereby, when the apparatus invokes an application pro,am, the apparatus modifies at least one selected type of object data according to a selected action.

2. The apparatus of claim 1 wherein the first selection means comprises:

(i) means for providing a visual depiction of the object data on a computer display communicating with the computer; and (ii) operator input means communicating with the computer for selecting a given visual depiction to select the object data associated with the given visual depiction.

3. The apparatus of claim 1 wherein the first selection means may select first and second selected types of object data and wherein the searching means identifies only common actions linked by the table to both of the first and second selected types of object data and applications of the common actions.

4. The apparatus of claim 1 wherein the second selection means comprises:

(i) means for providing a visual depiction of the identified actions on a computer display communicating with the computer; and (ii) operator input means communicating with the computer for selecting a given visual depiction to select the action associated with the given visual depiction.

5. A method of selecting applications for execution on an electronic computer, the application programs installed in a memory of the electronic computer to be executed by the electronic computer when invoked through an application identifier, the method comprising the steps of:

(a) selecting a type of object data to provide a selected type of object data;

(b) searching a table in the memory, the table storing application identifiers, object data, and actions, the table linking each application identifier with at least one type of object data and at least one action that may be performed by the identified application to identify actions and applications linked by the table to the selected type of object data;

(c) selecting an action from among the identified actions to provide a selected action; and (d) invoking the application program linked to the selected action to operate on the selected type of object data;

(e) whereby, when an application program is invoked, the application program modifies at least one selected type of object data according to a selected action.

6. The method of claim 5 wherein the step of selecting a selected type of object data comprises:
   (i) producing a visual depiction of the object data on a computer display communicating with the computer; and
   (ii) receiving input from an operator selecting a given visual depiction to select the object data associated with the given visual depiction.

7. The method of claim 5 wherein the step of selecting a selected type of object data includes the steps of selecting first and second selected types of object data and wherein the step of searching the table identifies only common actions linked by the table to both of the first and second selected types of object data and applications of the common actions.

8. The method of claim 5 wherein the step of selecting the selected action from among the identified actions comprises the steps of:
   (i) providing a visual depiction of the identified actions on a computer display communicating with the computer; and
   (ii) receiving operator input selecting a given visual depiction to select the action associated with the given visual depiction.

* * * * *